United States Patent
Blanding

(10) Patent No.: US 8,332,861 B1
(45) Date of Patent: Dec. 11, 2012

(54) VIRTUALIZED TEMPORARY INSTANT CAPACITY

(75) Inventor: William H. Blanding, Bow, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1011 days.

(21) Appl. No.: 12/289,681

(22) Filed: Oct. 31, 2008

(51) Int. Cl.
G06F 9/50 (2006.01)

(52) U.S. Cl. ....................................... 718/104

(58) Field of Classification Search .................. None
See application file for complete search history.

(56) References Cited

U.S. PATENT DOCUMENTS

| | | | | |
|---|---|---|---|---|
| 2002/0166117 A1* | 11/2002 | Abrams et al. | ................ | 717/177 |
| 2003/0135380 A1* | 7/2003 | Lehr et al. | ................ | 705/1 |
| 2004/0019456 A1* | 1/2004 | Circenis | ................ | 702/178 |
| 2004/0148498 A1* | 7/2004 | Circenis et al. | ................ | 713/1 |
| 2005/0010502 A1* | 1/2005 | Birkestrand et al. | ................ | 705/34 |
| 2006/0100962 A1* | 5/2006 | Wooldridge et al. | ................ | 705/50 |

* cited by examiner

*Primary Examiner* — Keith Vicary

(57) ABSTRACT

A system, and a corresponding method, implemented on a processor, allows for monitoring and control of temporary instant capacity (TiCAP) resources in a computer system. The system includes a resource management system (RMS), which includes a RMS monitor that tracks a workload executing on the computer system and determines when workload demand exceeds allocated non-TiCAP resource capacity, whereby a resource shortfall is generated, and a RMS processor module that compares the resource shortfall to granularity of supply of the TiCAP resources and that generates a TiCAP transfer control request based on the comparison. The system further includes a temporary instant capacity (TiCAP) system that monitors and controls allocation of TiCAP resources on the computer system, and which includes a RMS detection module that receives the request to transfer control of the TiCAP resources to the RMS, and a transfer module that transfers control of the TiCAP resources based on the request.

17 Claims, 4 Drawing Sheets

VIRTUALIZED TEMPORARY INSTANT CAPACITY

BACKGROUND

Temporary Instant Capacity (TiCAP) resources are computer system resources for which an end user of the computer system does not have usage rights, but which may be used on demand with a charge per time interval of use. The granularity of this usage (i.e., the length of the time intervals) is commonly determined by the granularity of the underlying computer hardware resources. The time interval granularity commonly is restricted or limited by the need for periodic monitoring of use. This limitation normally is not a significant problem when TiCAP usage is controlled manually, since a human user typically would not be interested in trying to control use of TiCAP resources in intervals of seconds or minutes, or in quantities less than an individual processor core. However, an automated system for controlling computing resources, such as a Workload Management System (WLMS) typically manages such resources on an individual workload basis, with allocation intervals and amounts that are significantly less than the usual TiCAP granularity. As a result, an end user may consume, and pay for, unneeded TiCAP resources. In addition, the end user may have difficulty understanding how the consumption of TiCAP resources may be allocated to workloads.

SUMMARY

Disclosed is a system, implemented on a processor, for monitoring and control of temporary instant capacity (TiCAP) resources in a computer system. The system includes a resource management system (RMS), which comprises a RMS monitor that tracks a workload executing on the computer system and determines when workload demand exceeds allocated non-TiCAP resource capacity, whereby a resource shortfall is generated, and a RMS processor module that compares the resource shortfall to granularity of supply of the TiCAP resources and that generates a TiCAP transfer control request based on the comparison. The system further includes a temporary instant capacity (TiCAP) system that monitors and controls allocation of TiCAP resources on the computer system, and which comprises a RMS detection module that receives the request to transfer control of the TiCAP resources to the RMS, and a transfer module that transfers control of the TiCAP resources based on the request.

DESCRIPTION OF THE DRAWINGS

The detailed description will refer to the following drawings in which like reference numbers refer to like items, and in which.

DETAILED DESCRIPTION

Figure 1:
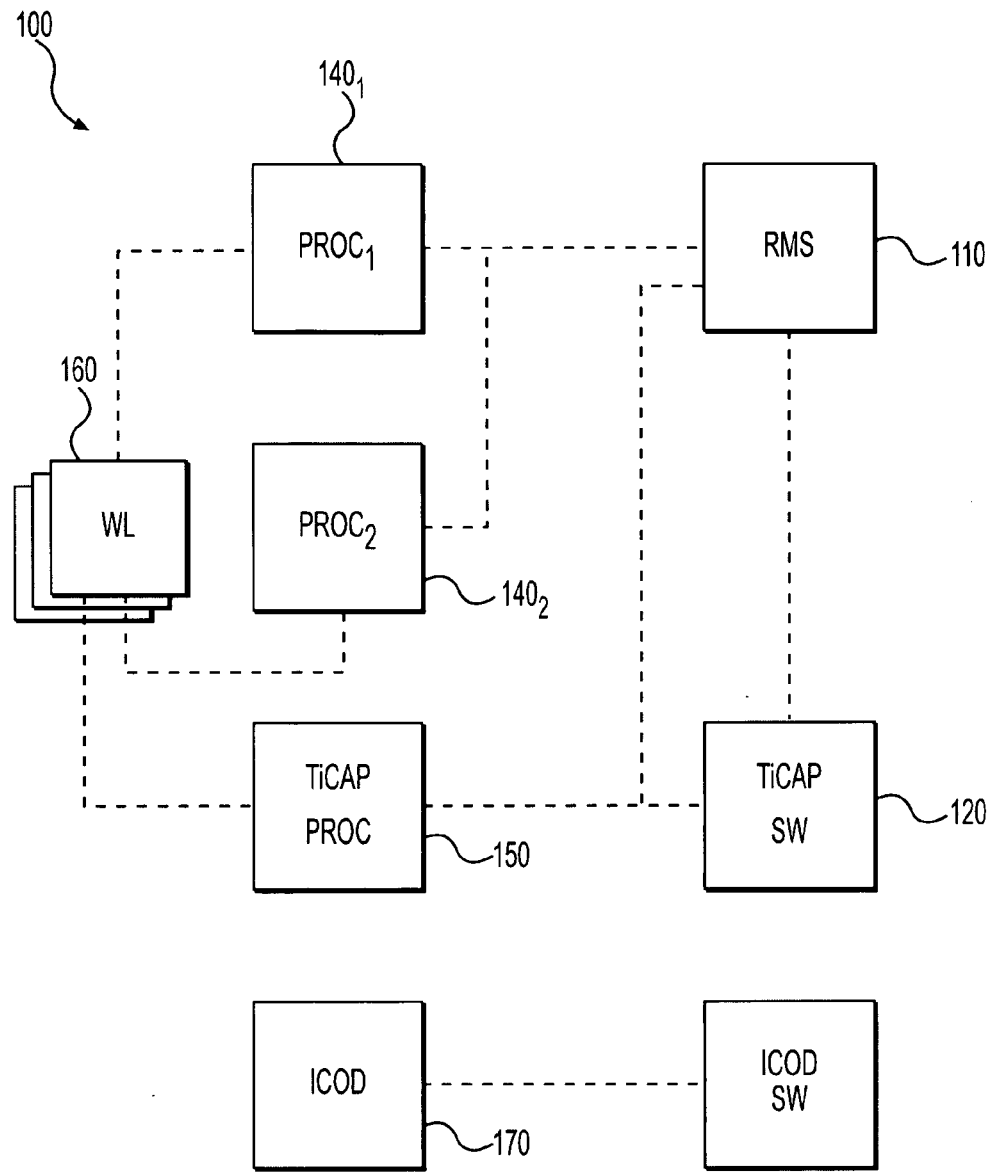
FIG. 1 illustrates an exemplary computer system in which temporary instant capacity resources are consumed.

A computer system may employ resources, such as processors, for which the computer system user has acquired full usage rights (purchase or lease), and other metered resources for which limited usage rights are acquired for temporary use of the metered resources. One class of metered resources are instant capacity resources. One sub-class of instant capacity resources are Temporary Instant Capacity (TiCAP) resources.

TiCAP resources are computer system resources for which an end user of the computer system does not have usage rights, but which may be used on demand with a charge per time interval of use. The granularity of this usage (i.e., the length of the time intervals and the amount of resources (e.g., number of processor cores)) is commonly determined by the granularity of the underlying computer hardware resources. The time interval granularity commonly is restricted or limited by the need for periodic monitoring of TiCAP resource use. This limitation normally is not a significant problem when TiCAP usage is controlled manually, since a human user typically would not be interested in trying to control use of TiCAP resources in intervals of seconds or minutes. Furthermore, a human user likely would not be interested in trying to control TiCAP processor usage in fractions of a processor core. However, an automated system for controlling computing resources typically manages such resources on an individual workload basis, with allocation resource intervals and resource amounts that are significantly less than the usual TiCAP granularity. As a result, an end user may consume, and pay for, unneeded TiCAP resources (by time and amount). In addition, the end user may have difficulty understanding how the consumption of TiCAP resources may be allocated to active workloads.

A Workload Management System (WLMS) is a typical automated resource management system that may be used to monitor and control execution of workloads and consumption of resources in computer systems, including TiCAP resources. Although a WLMS typically will monitor and control processor resources, the WLMS may be used to monitor and control other shared computing system resources, including, for example, memory, bandwidth, and storage capacity used by a computer system.

The WLMS is a computer-implemented, automated system that allows users to more precisely manage consumption of computing resources by workloads than is possible by manual means. A workload is a series of functions executed by an instance of an operating system, or by a subset of the operating system. The WLMS also may provide computer system users with real-time or near real-time information as to computer system resource consumption. Such information is provided, for example, using a graphical user interface.

When used with TiCAP resources, current WLMSs generally will activate and deactivate entire TiCAP cores according to a management interval for the specified domain. That interval typically ranges from 5 to 120 seconds. However, TiCAP usage monitoring software monitors resource consumption on a total server basis at 30 minute intervals. Usage is recorded in chunks of 1 core X 30 minutes. Synchronization with the resource manager's actions determines whether TiCAP activation by a resource manager (i.e., the computer end-user) is recorded as TiCAP consumption. To restrict actual TiCAP consumption to more closely match reported TiCAP consumption, an improved resource management system is disclosed.

FIG. 1 illustrates an exemplary computer system 100 in which an improved resource management system (RMS) 110 may be implemented to monitor and control full usage right resources (e.g., processors 140*i*) and, through TiCAP software 120, monitor and control, on a part-time basis, TiCAP resources. The RMS 110 is able to monitor and control, on a limited basis, the TiCAP resources 150 because the TiCAP software 120 is operating in a special resource manager mode.

In the computer system 100, the TiCAP resources (the processors 150), may be arranged into partitions (not shown). The computer system 100 may support simultaneous execution of multiple workloads 160. Each such workload may be assigned to a specific partition or processor resource, especially the processors 140$i$. Conversely, each processor 140$i$ may be assigned multiple workloads 160.

The computer system 100 may additionally include one or more metered processors, other than the TiCAP processors 150, for which the computer system user pays an incremental cost when using the metered resources. An example of a metered processor is an "instant capacity" processor 170, sometimes referred to as an ICOD (instant capacity on demand) processor. When using an instant capacity processor 170, the computer system user acquires usage rights on an "as needed" basis, and is charged accordingly. Thus, these instant capacity processors 170 constitute metered resources.

The instant capacity processors 150, 170 may be temporarily assigned to operate when workload demands exceed the computing capacity of the processors 140$i$. By paying for processing capacity "as needed" the computer system user can pay for a "small" computer system yet have a "large" computer system "in standby."

The computer system user pays for operation of the processors 170 regardless of their actual operating status. That is, the user pays for each processor 170 whether or not that processor is actually executing any operations. Indeed, the user pays for the processors 170 even if those processors 170 are not powered on. However, the user pays for the TiCAP processors 150 only when the TiCAP processors 150 are powered on and actually executing a workload.

As an example of a TiCAP implementation, the computer system end-user may purchase 30 days of prepaid temporary activation for instant capacity processors 150. This allows temporary processors installed in the computer system to be turned on and off, typically for short periods, to provide added capacity. A TiCAP processor day is 24 hours, or 1,440 minutes of activation for one of the temporary processor cores. A TiCAP day may be used by one TiCAP processor operating for 24 hours, or by four TiCAP operating for six hours each.

To implement the enhanced capacity of the "large" computing system with its instant capacity processors 150, a TiCAP (temporary instant capacity) regime and the accompanying TiCAP software 120 may be made available to the computer system user. With the TiCAP regime, the user acquires rights to use the TiCAP processors 150 by, for example, paying in advance for a certain quantity of processing time.

Thus, the TiCAP regime allows one or more unlicensed instant capacity processors to be activated for a period of pre-paid processing minutes without requiring permanent usage rights. When the TiCAP processor 150 is activated, the computer system user, under the TiCAP regime, obtains temporary usage rights.

A similar resource allocation scheme may be applied to other shared computing system resources, including, for example, memory, network bandwidth, and storage facilities used by the computer system 100. Furthermore, the computer system 100 may be configured exclusively with metered resources for which usage the computer system user pays an incremental cost; or may be configured with fully-licensed resources, exclusively. Whether configured with metered resources or fully-licensed resources, exclusively, or with a mix of the two, the computer system user may pay an incremental cost when additional resources are being consumed. However, the computer system user would like these additional costs to accurately reflect actual TiCAP resource consumption.

The RMS 110, adapted to provide virtualized temporary instant capacity, when operating, communicates with the TiCAP software 120 to activate a special resource manager mode in which the RMS 110 assumes responsibility for tracking TiCAP resource usage. The RMS 110 is trusted by the TiCAP software 120, to the extent that the TiCAP software 120 is able to delegate some of its TiCAP activation and monitoring functions to the RMS 110.

With this transfer of functions, the RMS 110 activates and deactivates TiCAP resources 150 as needed based on demands of workloads 160 executing on the computer system 100. When the workload demands result in the need for a TiCAP amount that does not correspond to the granularity provided by the TiCAP software 120, the RMS activates resources at the supported TiCAP granularity. However, only the resource amount actually required is made available to the workload 160. The remainder of the activated resource is sequestered and not available for use by any workload 160.

In an alternate implementation, the RMS 110 activates resources at the supported TiCAP granularity and makes those resources available to the requesting workloads 160. However, the RMS 110 monitors actual utilization of the TiCAP resources 150 and uses that data to determine the actual TiCAP resource consumption.

In either case, the RMS 110 records the amount of the TiCAP resource 150 determined to be consumed by the managed workloads 160 and the associated length of time of consumption. The RMS 110 periodically communicates with the TiCAP software 120 to report the recorded TiCAP resource consumption.

When operating in this special RMS mode, the TiCAP software 120 periodically monitors the computer system 100 to detect the presence of the RMS 110, and reassumes the function of tracking TiCAP usage when the RMS 110 no longer is operating.

Thus, by providing a special resource manager mode for TiCAP usage management and monitoring, it is possible to take advantage of the RMS's finer control over resource management to provide TiCAP resource consumption at the granularity at which the RMS 110 manages resources, by trusting the RMS 110 to restrict actual consumption of TiCAP resources 150 to match the reported consumption by the workload 160.

Figure 2:
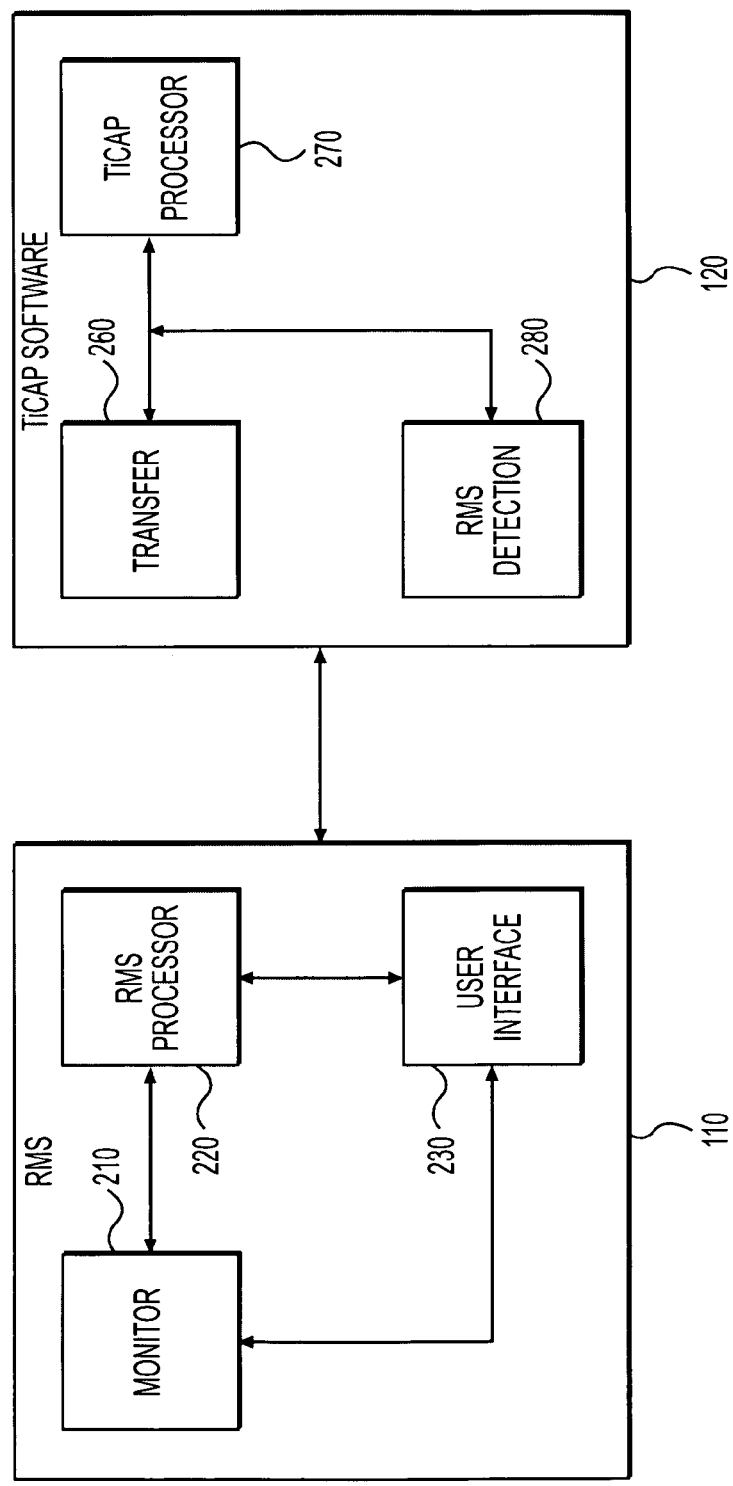
FIG. 2 is a block diagram of an exemplary resource management system that implements virtualization of temporary capacity resources.

In an embodiment, the RMS resides as software on the user's computer system 100. FIG. 2 is a block diagram of an exemplary RMS 110, implemented on the computer system 100 of FIG. 1, that can be used to control resource utilization in the computer system 100 of FIG. 1, and more specifically provide for fine granularity control of TiCAP resources 150.

The RMS 110 includes a resource/workload monitor 210 that tracks which workloads 160 are using which resources, and receives requests from the workloads 160 to add additional resources. Coupled to the resource monitor 210 is processor 220, which selects, revises, and applies TiCAP resources to the workloads 160. Finally, user interface module 230 produces a user interface that the computer system user requires in order to efficiently manage the consumption of computer system resources.

The TiCAP software 120 includes a transfer module 260, which is used to transfer TiCAP monitoring and control functions to the RMS processor 220. The TiCAP software 120 also includes a TiCAP processing module 270 that monitors and controls the TiCAP resources when the RMS 110 is not operating, and an RMS detection module 280 that detects operation of the RMS 110 and alerts the transfer module 260 to transfer the TiCAP monitoring and control functions. When these control functions reside in the RMS 110, the TiCAP software 120 is designated as operating in a special RMS mode.

Figure 3:
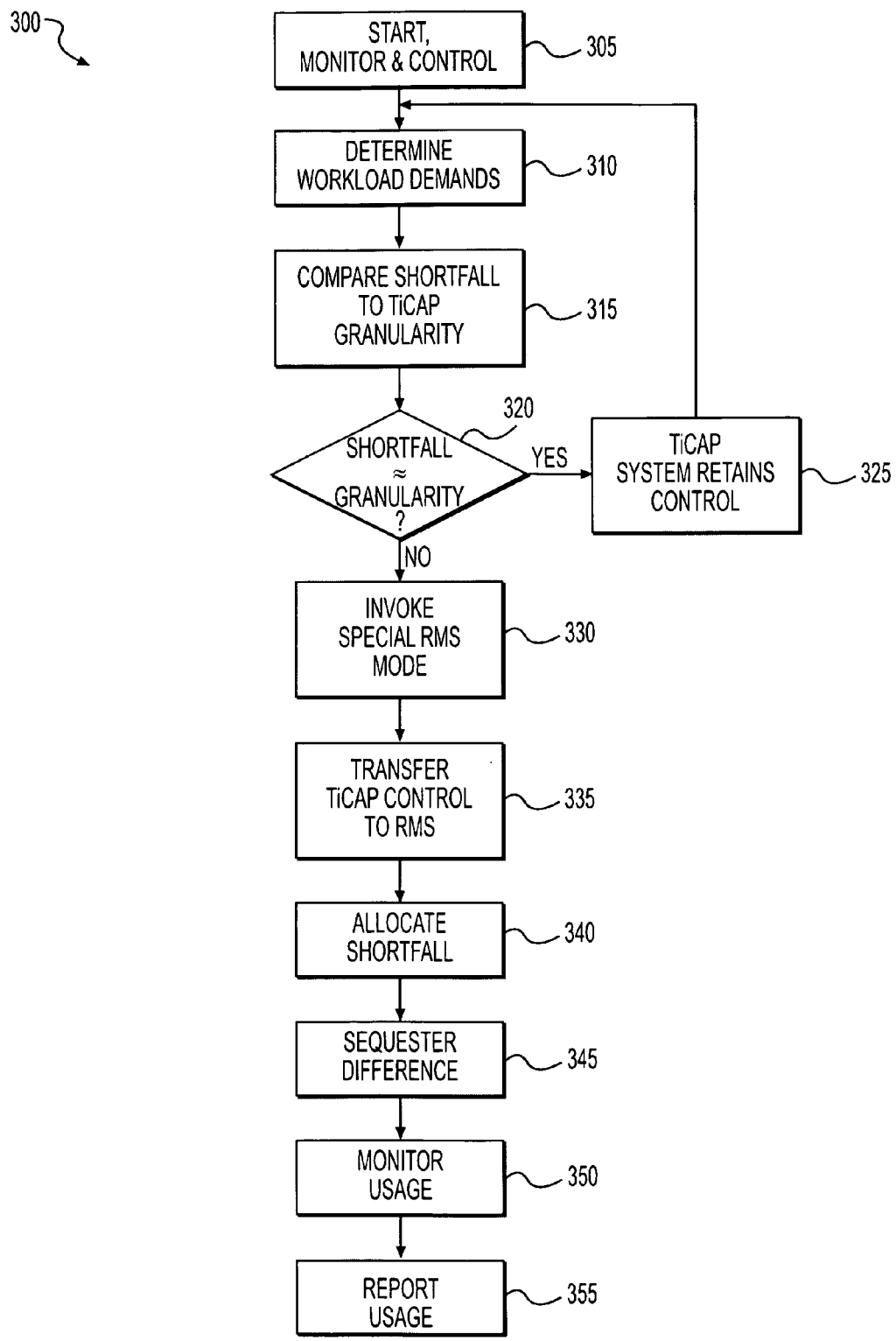
FIG. 3 is a flowchart illustrating exemplary operations of the resource management system of FIG. 2.

FIG. 3 is a flowchart illustrating an exemplary, combined operation 300 of the RMS 110 and the TiCAP software 120. The operation 300 begins with block 305, with the RMS 110 monitoring and controlling workloads 160 executing on the computer system 100 and assignment of non-TiCAP resources 140 to the workloads 160; and the TiCAP software 120 monitoring and controlling allocation of TiCAP resources 150.

In block 310, the RMS 110 determines resource demands for the workloads 160 and determines when the workload demand exceeds non-TiCAP resources available for allocation to the workloads, where the differential constitutes a resource shortfall. In block 315, the RMS 110 compares the resource shortfall to the TiCAP granularity, wherein the TiCAP granularity includes both time intervals and resource amounts. In block 320, the RMS 110 determines if the TiCAP granularity matches (approximately) the resource shortfall. If the resource shortfall matches the TiCAP granularity, then in block 325, the allocation of the TiCAP resources remains with the TiCAP system 120. However, in block 320, if the two quantities do not match, the operation 300 moves to block 330, and the special RMS mode is invoked. When the special RMS mode is invoked, the operation 300 continues to block 335 and control of the TiCAP resources 150 is transferred to the RMS 110. Then, in block 340, the RMS 110 allocates to the workloads, just enough of the TiCAP resources (time interval or amount) to make up the resource shortfall. The remaining amount (the difference between the shortfall and the TiCAP granularity) are sequestered (block 345) by the RMS 110 and are not available to any workload 160. In block 350, the actual TiCAP usage by the workloads 160 is recorded by the RMS 110 and reported (block 355) to the TiCAP system 120.

Figure 4:
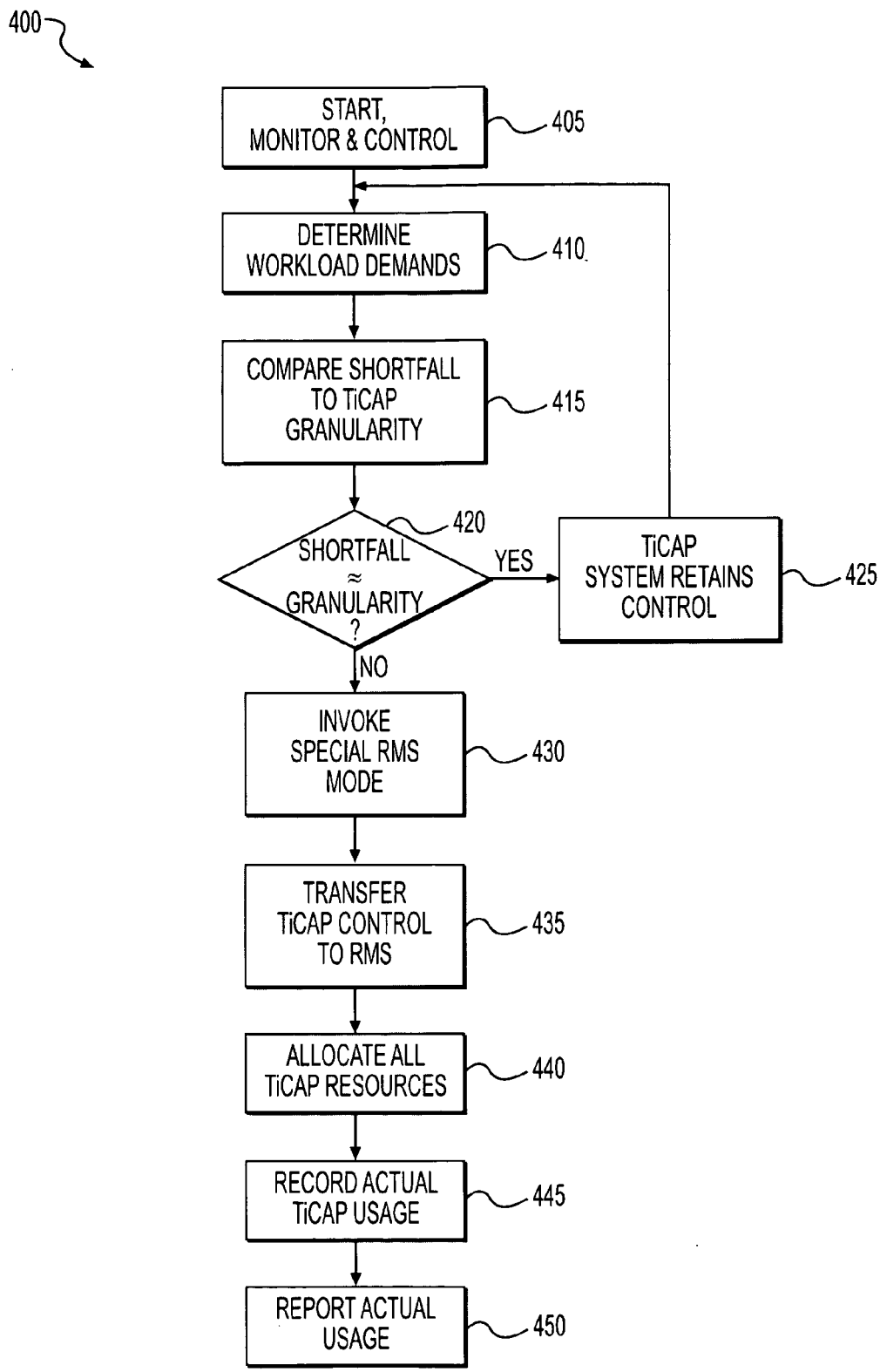
FIG. 4 is a flowchart illustrating other operations of the resource management system of FIG. 2.

FIG. 4 is a flowchart illustrating an alternate, combined operation 400 of the RMS 110 and the TiCAP software 120. The operation 400 includes blocks 405, 410, 415, 420, 425, 430, and 435, that correspond to blocks 305, 310, 315, 320, 325, 330, and 335, respectively, of the operation 300 of FIG. 3. However, different from blocks 340 and 345, the RMS 110, in operation 400 step 440 makes the entire TiCAP resources available to the workloads 160. Then, in block 445, the RMS 110 records actual TiCAP usage by the workloads 160. The operation 400 then continues with block 450 and the RMS 110 reports the actual usage to the TiCAP software 120.

The various disclosed embodiments may be implemented as a method, system, and/or apparatus. As one example, exemplary embodiments are implemented as one or more computer software programs to implement the methods described herein. The software is implemented as one or more modules (also referred to as code subroutines, or "objects" in object-oriented programming) The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of a handheld portable electronic device) and accessed by a processor using a bus. The techniques and methods for embodying software programming code in memory, on physical media, and/or distributing software code via networks are well known and will not be further discussed herein.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A computer system, comprising:
   at least one processor;
   a resource management system (RMS) executable on the at least one processor, comprising:
      an RMS monitor to track a workload executing in the computer system and to determine when workload demand exceeds allocated non-TiCAP (temporary instant capacity) resource capacity such that a resource shortfall is present, and
      an RMS processor module to compare the resource shortfall to a granularity of supply of TiCAP resources and, in response to the resource shortfall being less than the granularity, to generate a TiCAP transfer control request to allocate only a portion of the TiCAP resources corresponding to an amount of the resource shortfall to the workload; and
   a TICAP system executable on the at least one processor to monitor and control allocation of the TiCAP resources in the computer system, comprising:
      an RMS detection module to receive the TiCAP transfer control request to transfer control of the portion of TiCAP resources to the RMS, and
      a transfer module to transfer control of the portion of TiCAP resources based on the TiCAP transfer control request.

2. The system of claim 1, wherein the TiCAP resources include processors.

3. The system of claim 1, wherein the RMS is to track usage of the TiCAP resources.

4. The system of claim 1, wherein the RMS is to allocate a first portion of the TiCAP resources to the workload to meet the resource shortfall, and to sequester a second portion of the TiCAP resources such that the second portion is unavailable for use by any workload.

5. The system of claim 1, wherein the RMS processor module is to not generate the TiCAP transfer control request in response to determining that the resource shortfall matches the granularity.

6. The system of claim 1, wherein the RMS processor module is to record actual TiCAP usage by the workload and report the actual TiCAP usage to the TiCAP system.

7. The system of claim 1, wherein the TiCAP system is to:
   detect when the RMS ceases operation; and
   transfer control from the RMS to the TiCAP system upon detecting that the RMS has ceased operation.

8. The system of claim 7, wherein the RMS is to cease operation when workload demand matches the allocated non-TiCAP resource capacity.

9. The computer system of claim 1, wherein the TiCAP system is to control assignment of TiCAP resources to the workload when the RMS has not assumed control of the TiCAP resources.

10. The computer system of claim 9, wherein the RMS processor module is to decline to generate the TiCAP transfer control request in response to the comparison indicating that the resource shortfall matches the granularity, and wherein the TiCAP system maintains control of assignment of TiCAP resources in an absence of the TiCAP transfer control request.

11. A method, implemented on at least one processor, for controlling allocation of temporary instant capacity (TiCAP) resources to a workload executing in a computer system, comprising:
    monitoring, by a resource management system (RMS), execution of the workload and determining when workload demand exceeds non-TiCAP resource allocation such that a resource shortfall is present;
    comparing the resource shortfall to a granularity of the TiCAP resources; and
    based on the comparing indicating that the resource shortfall is less than the granularity, implementing an RMS mode in which control of the TiCAP resources is transferred from a TiCAP system to the RMS; and
    in the RMS mode, allocating, by the RMS, only a portion of the TiCAP resources corresponding to an amount of the resource shortfall to the workload.

12. The method of claim 11, wherein the granularity includes a time interval of usage of the TiCAP resources.

13. The method of claim 11, wherein the granularity includes a resource amount of the TiCAP resources.

14. The method of claim 11, further comprising:
    in response to the comparing indicating that the resource shortfall matches the granularity of the TiCAP resources, the TiCAP system maintaining control of assignment of the TiCAP resources to the workload, and the RMS does not assume control of the TiCAP resources.

15. A computer system comprising:
    at least one processor;
    a temporary instant capacity (TiCAP) system executable in the at least one processor to control assignment of TiCAP resources to a workload in the computer system; and
    a resource management system (RMS) executable on the at least one processor to:
        monitor the workload and determine when workload demand exceeds allocated non-TiCAP resource capacity such that a resource shortfall is present;
        in response to determining that the resource shortfall is less than a granularity of assignment of TiCAP resources, generate a transfer request to allocate only a portion of the TiCAP resources corresponding to an amount of the resource shortfall to the workload,
    wherein the TiCAP system is to transfer control of the assignment of the portion of TiCAP resources to the RMS in response to the transfer request.

16. The computer system of claim 15, wherein the RMS is to decline to generate the transfer request in response to determining that the resource shortfall matches the granularity of assignment of TiCAP resources, and wherein the RMS is to maintain control of assignment of the TiCAP resources in response to absence of the transfer request.

17. The computer system of claim 16, wherein the RMS provides a finer granularity of control of assignment of the TiCAP resources than the TiCAP system.

* * * * *

UNITED STATES PATENT AND TRADEMARK OFFICE
CERTIFICATE OF CORRECTION

PATENT NO. : 8,332,861 B1  
APPLICATION NO. : 12/289681  
DATED : December 11, 2012  
INVENTOR(S) : William H. Blanding It is certified that error appears in the above-identified patent and that said Letters Patent is hereby corrected as shown below:

In the Claims

In column 6, line 36, in Claim 1, delete "TICAP" and insert -- TiCAP --, therefor.

Signed and Sealed this
Seventeenth Day of June, 2014

Michelle K. Lee
*Deputy Director of the United States Patent and Trademark Office*